(12) United States Patent
Mao et al.

(10) Patent No.: US 12,708,498 B2
(45) Date of Patent: Aug. 18, 2026

(54) CLEANING UNIT FOR A SURFACE CLEANING DEVICE

(71) Applicant: KONINKLIJKE PHILIPS N.V., Eindhoven (NL)

(72) Inventors: Jingliang Mao, Shoreline, WA (US); Sungsoo Lee, Bellevue, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 305 days.

(21) Appl. No.: 18/032,423

(22) PCT Filed: Oct. 14, 2021

(86) PCT No.: PCT/EP2021/078379
§ 371 (c)(1),
(2) Date: Apr. 18, 2023

(87) PCT Pub. No.: WO2022/084126
PCT Pub. Date: Apr. 28, 2022

(65) Prior Publication Data

US 2023/0404725 A1 Dec. 21, 2023

Related U.S. Application Data

(60) Provisional application No. 63/093,684, filed on Oct. 19, 2020.

(30) Foreign Application Priority Data

Nov. 16, 2020 (EP) .................................... 20207826

(51) Int. Cl.
*A61C 17/20* (2006.01)
*A61C 17/22* (2006.01)
*A61C 19/06* (2006.01)

(52) U.S. Cl.
CPC ........... *A61C 17/20* (2013.01); *A61C 17/221* (2013.01); *A61C 19/06* (2013.01)

(58) Field of Classification Search
CPC ... A61C 19/06; A61C 17/221; A61C 17/3481; A61C 17/20; A46B 15/0022; A46B 15/0026; A46B 15/0028
(Continued)

(56) References Cited

U.S. PATENT DOCUMENTS 3,840,932 A 10/1974 Balamuth et al.
3,881,056 A 4/1975 Gibson et al.
(Continued)

FOREIGN PATENT DOCUMENTS

CN 1874703 A 12/2006
JP 2009240749 A 10/2009

OTHER PUBLICATIONS

International Search Report and Written Opinion Dated Nov. 15, 2021 for International Application No. PCT/EP2021/078379 Filed Oct. 14, 2021.

*Primary Examiner* — Katina N. Henson

(57) ABSTRACT

A surface cleaning means is proposed based on the combined use of ultrasound and radiofrequency electromagnetic emissions, propagated onto a surface to be cleaned, to provide synergistic cleaning action. One aspect provides a cleaning unit which comprises a body which includes an ultrasound transducer arrangement and an RF emitter arrangement, and wherein the two are arranged such that, when driven by respective drive signals, ultrasonic and RF emissions (for providing a cleaning action) are generated which overlap in a common spatial region, to thereby provide combined cleaning action in the common spatial region. One example application is for use for oral cleaning.

14 Claims, 4 Drawing Sheets

(58) Field of Classification Search
USPC .......................................................... 15/167.1
See application file for complete search history.

(56) References Cited

U.S. PATENT DOCUMENTS

| | | | |
|---|---|---|---|
| 3,941,424 A | 3/1976 | Balamuth et al. | |
| 4,146,869 A | 3/1979 | Snyder | |
| 4,333,197 A | 6/1982 | Kuris | |
| 4,746,870 A | 5/1988 | Underhill | |
| 5,150,492 A | 9/1992 | Suroff | |
| 5,378,153 A | 1/1995 | Giuliani et al. | |
| 6,417,602 B1 | 7/2002 | Agam et al. | |
| 8,156,600 B2 | 4/2012 | Roberts | |
| 10,016,626 B2 | 7/2018 | Zovrin et al. | |
| 12,109,086 B2 * | 10/2024 | Demarest ............. | A61C 19/066 |
| 2002/0047009 A1 | 4/2002 | Flugstad et al. | |
| 2002/0197182 A1 | 12/2002 | Minter | |
| 2007/0190509 A1 | 8/2007 | Kim | |
| 2007/0239075 A1 | 10/2007 | Rosenberg et al. | |
| 2008/0255498 A1 * | 10/2008 | Houle ................ | A61C 17/0208 604/20 |
| 2013/0203008 A1 | 8/2013 | Kressman et al. | |
| 2014/0093836 A1 | 4/2014 | Wolpo | |
| 2014/0259474 A1 | 9/2014 | Sokol et al. | |
| 2014/0332406 A1 | 11/2014 | Nottke et al. | |
| 2016/0218725 A1 | 7/2016 | Stoner | |
| 2017/0116665 A1 | 4/2017 | Alzahrani | |

* cited by examiner

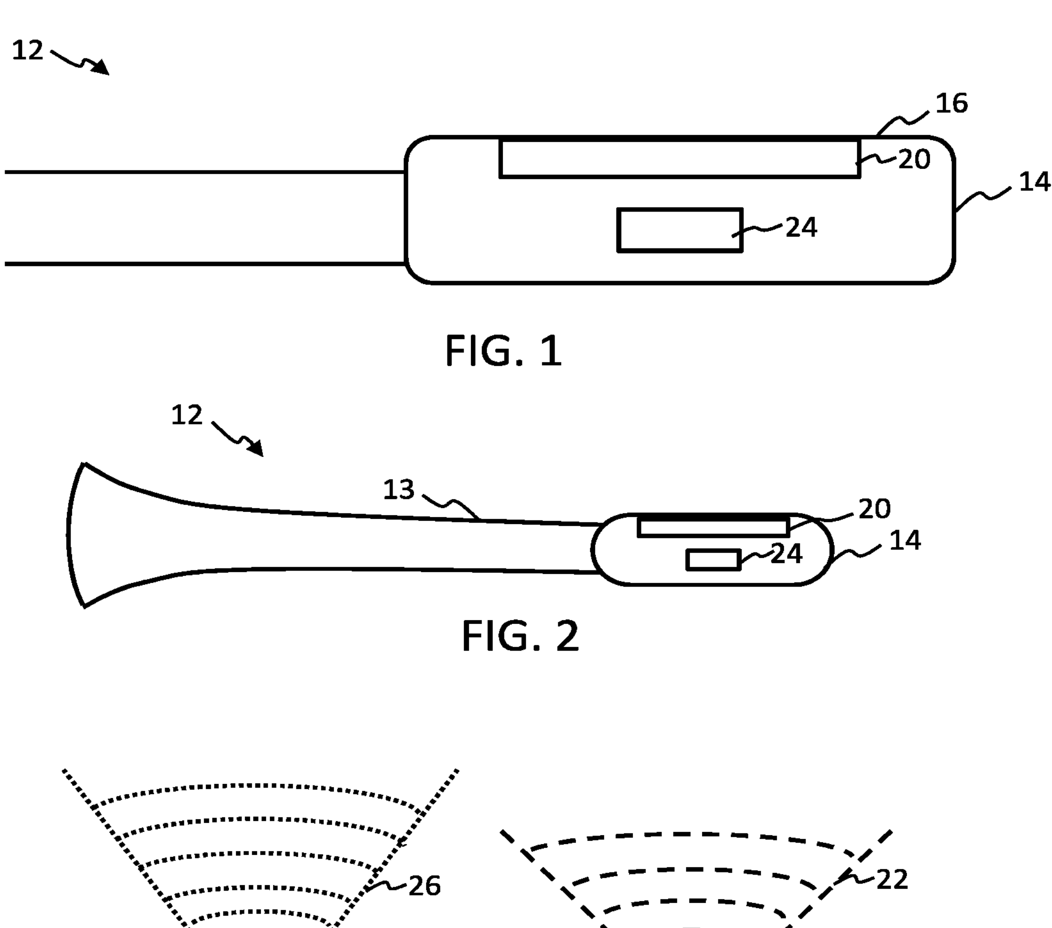
FIG. 1
FIG. 2
FIG. 3
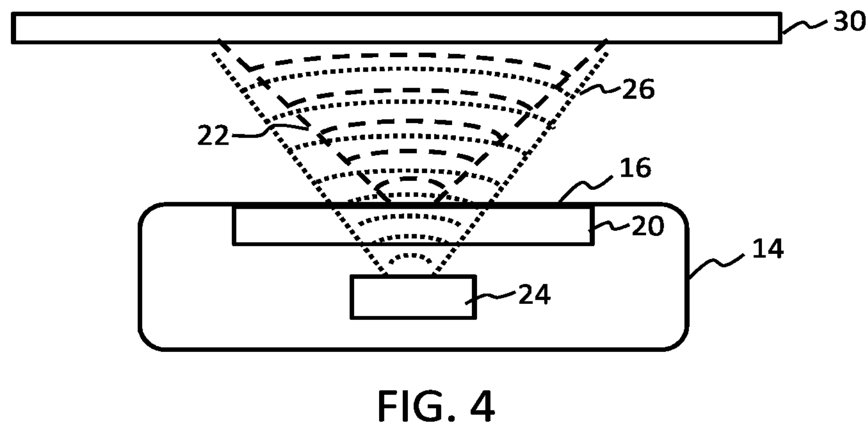
FIG. 4

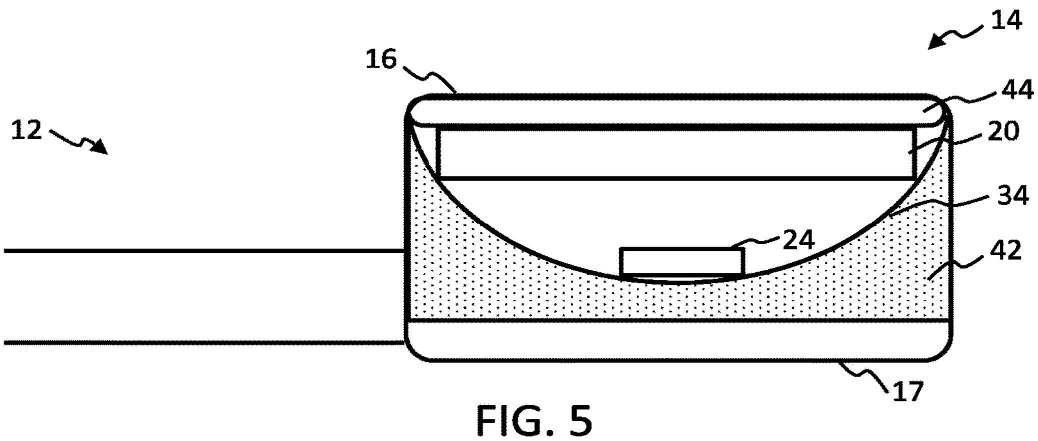
FIG. 5
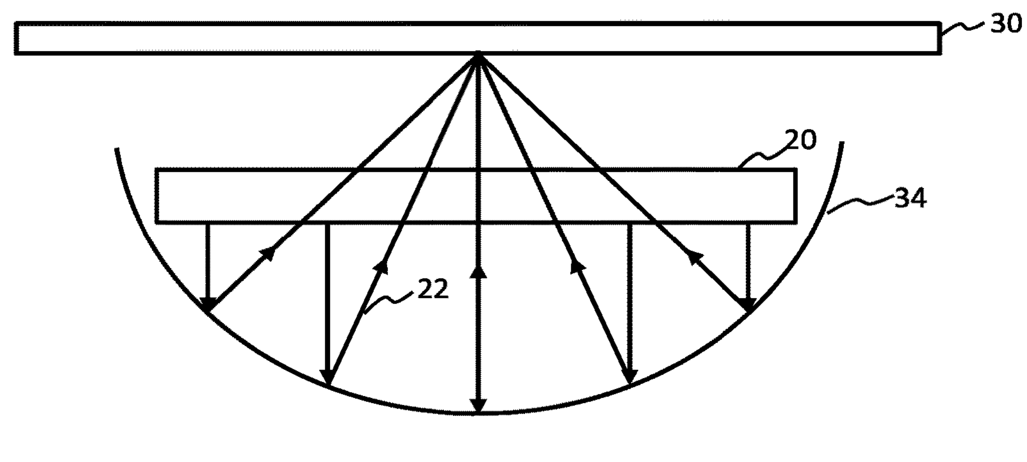
FIG. 6
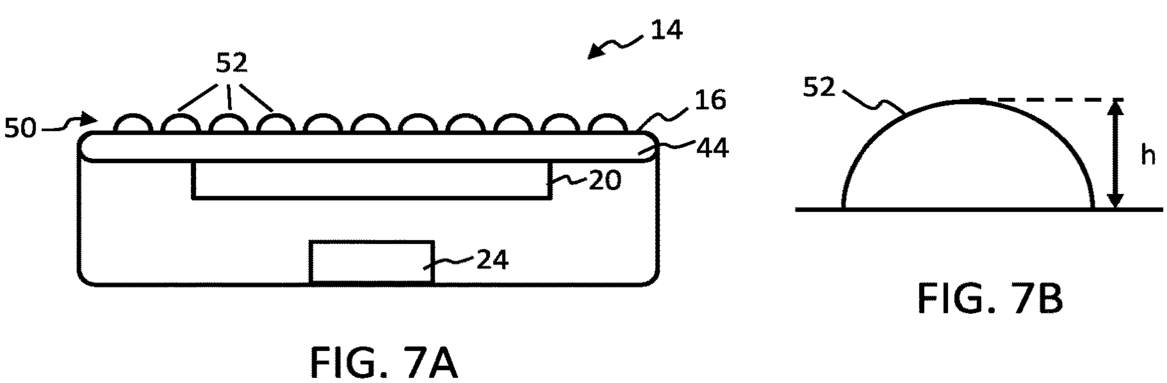
FIG. 7A
FIG. 7B

CLEANING UNIT FOR A SURFACE CLEANING DEVICE

This application is the U.S. National Phase application under 35 U.S.C. § 371 of International Application No. PCT/EP2021/078379, filed on Oct. 14, 2021, which claims the benefit of U.S. Application No. 63/093,684, filed Oct. 19, 2020 and EP Application No. 20207826.7, filed Nov. 16, 2020. These applications are hereby incorporated by reference herein.

FIELD OF THE INVENTION

The present invention relates to a cleaning unit for a surface cleaning device.

BACKGROUND OF THE INVENTION

Surface cleaning is a task employed in a range of different application areas, which can include household, industrial, institutional, and in the field of health care.

Within the field of healthcare, surface cleaning devices can be used for cleaning surfaces of teeth, as part of an oral healthcare function.

Teeth cleaning and gum disease prevention are important part of oral hygiene. It involves the removal of dental pellicles, plaque, and tartar from teeth to prevent dental caries, gingivitis, and periodontal disease. Currently, manual and power toothbrush are the most common teeth-cleaning tools. These generally consist of a head of tightly clustered bristle (brush head), atop of which toothpaste can be applied, mounted on a handle which facilitates the cleaning of hard-to-reach areas of the mouth. Other example oral cleaning devices include powered brushing mouthpiece devices. In operation, a power toothbrush makes rapid oscillatory bristle motions such as back-and-forth oscillation, rotation-oscillation, or vibration, to clean teeth. If motions are controlled at sonic speeds, this is referred to as sonic toothbrushing. A sonic toothbrush creates the motion or vibration in the audible frequency range from 20 Hz to 20,000 Hz.

At present, all toothbrushes have bristles on the brush head. The bristles are commonly made of non-biodegradable nylon, which constitute a significant source of environmental pollution after disposal. It is generally recommended that softer bristles are better for tooth-brushing, in view of potential undesired abrasion of tooth enamel and trauma to gum tissue if harder bristles are used.

In cleaning teeth, tooth brushing cleans or sweeps away two types of undesired deposits from the tooth surface: plaques and extrinsic stains. In dentistry, calculus or tartar is a form of hardened dental plaque. Once formed, calculus is firmly attached and too hard to be removed by a normal power or manual toothbrush. Tartar hardens into calculus if not removed every 24 hours. Calculus cannot be removed by current available power toothbrushes and flossing. Instead, calculus buildup has to be removed with special ultrasonic tools or dental hand instruments (e.g. periodontal scaler) by a dental professional.

A recent development has seen incorporation of radiofrequency (RF) generating elements within toothbrushing devices, in combination with sonic vibration of brush bristles. Radio frequency emissions have a dielectric heating effect for certain materials, which provides for a softening or 'melting' of plaque on tooth surfaces. This can aid in removal of the plaque with the power toothbrush. However, the effect is only limited, and this technology remains unable to provide for calculus removal. It also does not provide any cleaning effect in regions mechanically inaccessible to the bristles.

Improvements in the field of surface cleaning devices are generally sought.

SUMMARY OF THE INVENTION

The invention is defined by the claims.

According to examples in accordance with an aspect of the invention, there is provided a cleaning unit for a surface cleaning device, the cleaning unit comprising:

a body;

an ultrasound transducer arrangement carried by the body, the transducer arrangement comprising one or more ultrasonic transducers adapted to generate ultrasonic emissions responsive to one or more drive signals;

an electromagnetic emitter arrangement carried by the body, the electromagnetic emitter arrangement adapted to generate radio frequency electromagnetic emissions responsive to supply of a radiofrequency drive signal;

wherein the ultrasound transducer arrangement and the emitter arrangement are arranged for generation of ultrasonic emissions and EM emissions which overlap spatially, to permit simultaneous ultrasound and RF stimulation of a surface-to-be-cleaned.

The transducer arrangement and/or the emitter arrangement may be housed within the body.

Embodiments of the present invention are based on the concept of using a combination of ultrasonic stimulation and RF electromagnetic stimulation to achieve improved cleaning of surfaces. The application of RF waves to a surface can achieve dielectric heating of deposits on surfaces. This can cause softening or melting of the deposits. This can make these deposits easier to remove. Ultrasonic stimulation of surfaces can induce cavitation where there is a layer of liquid in contact with the surface to be cleaning and located between this surface and the ultrasound transducers. Cavitation is known to have an abrasive effect on surfaces, which can be used to clean contaminants from surfaces. The use of RF in combination with ultrasound, leads to improved cleaning effect from the cavitation, since the contaminants are electromagnetically softened concurrently with the application of the ultrasound. This leads to an improved cleaning effect.

The cleaning unit may be an entirely passive component, comprising no active electronic components, and wherein the ultrasound and RF emissions are stimulated only responsive to application of drive signals originating externally. However, this is not essential in all embodiments.

In some embodiments, the cleaning unit comprises an arrangement of protrusions or cleaning elements on an (external) surface of the body. These may be for performing a cleaning function during use.

The protrusions or cleaning elements may be carried on a face of the body.

The protrusions or cleaning elements may be for making operative contact with a surface-to-be-cleaned during use, for enabling a mechanical cleaning action.

One advantageous application for embodiments of the invention is use for oral cleaning. Here, the cleaning unit may be a cleaning unit for an oral cleaning device such as a toothbrush type device, or a mouthpiece device. However, embodiments may alternatively be used for a wide range of other surface cleaning applications.

The cleaning unit may in some embodiments be an attachment for releasably coupling to a base unit (e.g. a handle) of a cleaning device, where said base unit incorporates a source for the RF drive signals and ultrasound drive signals. In other embodiments, the cleaning unit may form an integral part of a broader cleaning device.

In some examples, the cleaning unit may be configured such that, when driven by respective drive signals, the ultrasonic emissions and RF emissions are propagated from the cleaning unit body in a common direction, and/or toward a common spatial area, e.g. a common focal area, plane or point. This allows for simultaneous ultrasound and RF stimulation of a surface-to-be-cleaned.

In accordance with one or more embodiments, the body may comprise a first outer surface forming a first face of the body, the first face for positioning adjacent to surfaces to be cleaned during use; and wherein the transducer arrangement and the electromagnetic emitter arrangement are each arranged to generate emissions which propagate in a direction out from at least a portion of the first face.

The first face forms an emission output face of the cleaning unit. The transducer arrangement and/or the emitter arrangement may be housed within the body. The RF and ultrasound emissions may propagate out from the body via transmission through the first face.

The RF emissions and the ultrasonic emissions may propagate from the body along a common propagation path.

In one or more embodiments, the body may be structurally configured to permit positioning of said first face of the body adjacent to a surface-to-be-cleaned, at a distance from the surface of 5 mm or less. By way of example, the first face may comprise a flat plane, or may carry an array of protruding elements, wherein a maximum height of the array of protruding elements from the first face is no greater than 5 mm.

In accordance with one or more embodiments, the body may comprise an acoustic wave directing element arranged to receive the ultrasonic emissions from the ultrasound transducer arrangement and to redirect the emissions along a pre-defined one or more propagation paths out from and/or away from the body.

The wave directing element allows greater control over the output direction of the ultrasound emissions, which for example enables the emissions to be directed to a desired plane, point or region. By positioning the body such that a surface to be cleaned lies within the spatial area to which the waves are redirected, the surface is ultrasonically stimulated by the waves.

The ultrasound transducer arrangement and the wave directing element may be housed within the body. The one or more paths may pass out of the body for interception by a surface-to-be-cleaned. The one or more paths may pass out of the body through the first surface.

The emitter arrangement may be arranged so as to generate emissions in use which are directed along the same one or more propagations paths as achieved by the redirection element. In some examples, the emitter arrangement may be arranged such that its emissions are also received and redirected by the wave directing element.

The acoustic wave-directing element may be adapted to focus the received acoustic emissions into one or more ultrasound beams, the one or more beams directed along said one or more propagation paths. Here, the wave directing element additionally performs a beam focusing function.

In some examples, the acoustic wave-directing element may comprise one or more parabolic acoustic reflectors. This provides a structurally simple arrangement for focusing and directing the ultrasound emissions.

In accordance with one or more embodiments, the body may comprise an ultrasound shield component arranged to inhibit propagation of ultrasound waves out from the body in one or more directions.

For example, the body may further comprise a second outer surface, and forming a second face of the body, and wherein the shield is arranged to inhibit ultrasound wave propagation out from the second surface. The second outer surface may for example be on a reverse side of the body to the first outer surface. By way of example, this may be useful in oral cleaning applications for preventing ultrasound propagation out of surfaces of the cleaning unit body which in use face toward non-targeted oral surfaces and tissues, for example a back of a toothbrush head.

The shield component may block the ultrasound emissions.

The shield component may be a body formed of an ultrasound attenuating material, for example a foam material. The shield component is arranged to intercept ultrasound wave propagation from inside the body of the cleaning unit toward a certain one or more outer boundaries of the body.

In some embodiments, the shield component may comprise a multi-layered foam element which includes materials with different relative acoustic impedance levels (relative to one another).

In accordance with one or more embodiments, the cleaning unit may further comprise an impedance matching layer positioned between the first outer surface and an output surface of the ultrasound transducer arrangement. An impedance matching layer improves efficiency of ultrasound transmission between the ultrasound transducer and the first face of the body.

In accordance with one or more embodiments, the body may comprise a first outer face, and wherein the transducer arrangement is arranged for generating ultrasonic emissions in operation which propagate out from at least a portion of the first face, and wherein the first face carries an arrangement of protrusions extending outwardly from the first face, the protrusions for making operative contact with a surface-to-be-cleaned during use, for enabling a mechanical cleaning action, and wherein the protrusions extend to a maximum height from the first face of less than or equal to 5 mm.

The protrusions are carried by the at least portion of the first face through which the ultrasound emissions of the ultrasound transducer arrangement are arranged to be transmitted. This way, when the first face is applied against the surface to be cleaned, the protrusions will correspond spatially to the region of the surface-to-be-cleaned that will be ultrasonically stimulated. This enables, during operation, simultaneous mechanical and ultrasonic (and RF) cleaning action of a common area of a surface-to-be-cleaned.

The maximum height of 5 mm ensures a maximum separation between the output face of the cleaning unit body and the surface to be cleaned. This is important for minimizing attenuation of the ultrasound waves travelling between the cleaning unit face and the surface to be cleaned when the protrusions are applied against the surface to be cleaned. This enhances the cleaning effect. The attenuation is reduced both for waves traveling through the spaces between neighboring protrusions, and waves travelling through the protrusions themselves.

By way of example, in the application area of oral cleaning, this marks a change from the standard structural design for oral cleaning units, wherein a body of the cleaning unit is typically provided with elongate bristles upstanding from a face of the body which force a separation between said face and the tooth surface of far greater than 5 mm. This would lead to increased attenuation of ultrasound emissions, due to the larger distance through which the ultrasound waves must travel to reach the surface. This also reduces the cavitation effect, since the ultrasound power of the emissions once the acoustic waves reach the surface to be cleaned is reduced. By using shorter protrusions, the cavitation effect is enhanced, leading to improved cleaning efficacy.

The protrusions may all be at the same height, or may differ in height. For example, the distal ends of the protrusions may define an upper surface profile or envelope which may vary in height, and wherein a maximum height of the upper surface profile or envelope from the first surface is no greater than 5 mm.

In accordance with one or more embodiments, each protrusion may be an integrally formed structure, i.e. is monolithic.

In accordance with one or more embodiments, the protrusions may comprise bumps or bosses. The protrusions may be dots (e.g. microdots). The protrusions may comprise ridges. The protrusions may comprise bristles or bristle bundles.

In accordance with one or more embodiments, the protrusions may be formed of a material having a Shore A Scale hardness of between 5 to 120, preferably 10 to 100, and more preferably from 20 to 70.

Attenuation of ultrasound waves decreases in relation to the bulk modulus of the medium through which they are transmitted. For example, soft nylon bristles are a relatively poor transmission medium for ultrasound waves, due to their relative softness. The harder the medium, the lower attenuation of the sound waves that travel through it.

In accordance with one or more embodiments, the body may comprise at least a first and second section, wherein the first face is comprised by the first section, and wherein the first section is detachable from the second section, and wherein the second section comprises the transducer arrangement and the emitter arrangement. This permits replacement of the portion of the body which carries the protruding elements. This allows these mechanical cleaning elements to be replaced regularly, without the need to replace the transducers or emitters at the same time.

The first section may be an integrally formed structure in some examples (i.e. monolithic). This means that the arrangement of protrusions is integrally formed with the surface from which they protrude In accordance with one or more embodiments, the cleaning unit may be for an oral cleaning device, and wherein the body is for being received in a mouth of a user.

The surfaces to be cleaned in this case may be tooth surfaces.

When utilized orally, the combined ultrasound and RF emissions advantageously allow for cleaning in areas which are mechanically inaccessible, e.g. gingival and sub-gingival regions. Thus oral cleaning and consequently oral health can be improved.

In addition to performing a cleaning function, when utilized orally, the combined used of ultrasound and radio frequency emissions enable a range of advantageous treatment effects. For example, RF emission enhances gingival tissue perfusion, which can provide a healing effect for inflamed gums. For example, the RF waves provide for fibroblast recruitment, and the ultrasound waves provide for collagen-type conversion. These provide complementary parts of the same general healing response, but the two energies of tissue repair synergistically enhance or boost one another.

The cleaning unit may form a head portion for an oral cleaning device, for instance a head portion for a probe-type cleaning device for insertion in the mouth. This may take a similar structural form as a toothbrush, with a handle portion to which is attached (fixedly or releasably) the head portion.

In accordance with one or more embodiments, the ultrasound transducer arrangement and/or the emitter arrangement may each be arranged such that their respective emissions are propagated from the body in more than one direction.

For example, in accordance with one or more embodiments, at least a portion of the body may be tubular, and wherein the body comprises an outer surface which is tubular, said outer surface forming an RF and ultrasound emission output face. The ultrasound transducer arrangement may be arranged such that the ultrasound emissions are propagated away from the output face in a plurality of directions.

The emissions may be emitted in directions which span 360 degrees around the body.

In accordance with a further aspect of the invention, there is provided a surface cleaning device, the device either comprising, or being adapted in use to be electrically and mechanically coupleable to, a cleaning unit in accordance with any example or embodiment outlined above or described below, or in accordance with any claim of this application.

The cleaning device comprises:

- an ultrasound driver module operable to generate one or more drive signals for driving generation of ultrasonic emissions when the drive signals are coupled to an ultrasound transducer arrangement; and
- a signal generator, adapted to generate an alternating drive signal for driving generation of radiofrequency emissions when the drive signals are coupled to an electromagnetic emitter arrangement.

In some embodiments, the surface cleaning device comprises a base unit. For example, the base unit may comprise a housing containing the ultrasound driver module and the RF signal generator. In some embodiments, the cleaning unit may be releasably coupleable to the base unit of the cleaning device. For example the cleaning unit is adapted to be releasably electrically and mechanically coupleable to the base unit. In further embodiments, the base unit may be fixedly attached to the cleaning unit.

The cleaning device may further comprise a controller operatively coupled with the ultrasound driver module and signal generator and adapted to control simultaneous activation of the ultrasound drive module and signal generator for simultaneous generation of the ultrasound drive signal and alternating RF drive signal. This allows, in operation, for simultaneous generation of RF and ultrasonic emissions.

The cleaning device may be an oral cleaning device.

The cleaning device may further comprise a mechanical drive mechanism, operable to provide a source of sonic frequency oscillatory movement, and a mechanical coupling arm for coupling the sonic oscillatory movement to the cleaning unit.

A controller may further be provided, adapted to control the ultrasound driver module, the signal generator and the mechanical drive mechanism to operate simultaneously during operation of the device.

In preferred examples, the signal generator may be adapted (or controlled) to generate a drive signal within the frequency range of 1 MHz-300 MHz, for causing emission by the EM emitter arrangement of EM emissions in the frequency range 1 MHz-300 Mhz.

The ultrasound driver module may be adapted (or controlled) to generate a drive signal for causing generation of ultrasound emissions in a frequency range of 20 kHz-300 MHz. In accordance with one set of embodiments, the device is for human use and wherein the ultrasound driver module is adapted (or controlled) to generate a drive signal for causing generation of ultrasound emissions of less than 10 MHz.

In accordance with one set of embodiments, the device is for non-human use, and wherein the ultrasound driver module is arranged to generate drive signals for generating ultrasound emissions at a frequency of 10 MHz or higher.

Examples in accordance with a further aspect of the invention provide a surface cleaning method comprising simultaneously applying ultrasound emissions and RF frequency electromagnetic emissions to a surface to be cleaned.

The method may further comprise making operative contact with a surface-to-be-cleaned with an arrangement of cleaning elements or protrusions. This may be for enabling a mechanical cleaning action. This may be done simultaneously with the application of the ultrasound emissions and the RF frequency electromagnetic emissions.

The aforementioned cleaning elements or protrusions may be carried on an (external) surface of said body. The cleaning elements or protrusions may be carried on an (outer) face of the body.

The application of the ultrasound emissions and the electromagnetic emissions may be achieved through operation of an ultrasound transducer arrangement and electromagnetic emitter arrangement respectively, and preferably wherein the ultrasound transducer arrangement and electromagnetic emitter arrangement are housed, carried or otherwise comprised by a common body which forms at least part of a cleaning unit for a cleaning device. For example, the ultrasound transducer arrangement and the emitter arrangement may be arranged for generation of ultrasonic emissions and EM emissions which overlap spatially, to permit the simultaneous ultrasound and EM stimulation of a surface-to-be-cleaned.

The application of the ultrasound emissions and the electromagnetic emissions may be achieved through control of:

- an ultrasound driver module operable to generate one or more drive signals for driving generation of ultrasonic emissions when the drive signals are coupled to the aforementioned ultrasound transducer arrangement; and
- a signal generator, adapted to generate an alternating drive signal for driving generation of radiofrequency emissions when the drive signals are coupled to the aforementioned electromagnetic emitter arrangement.

In some embodiments, the method may be computer implemented, for example implemented by a controller or by a processing arrangement comprising one or more processors or controllers, and which for example are operatively coupled with the aforementioned ultrasound driver module and signal generator.

Another aspect of the invention may provide a computer program product comprising code means configured, when executed on a processor or controller, to cause the processor or controller to implement the method outlined above, or a method in accordance with any of the embodiments or examples described in this disclosure.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying schematic drawings, in which:

FIGS. 1-2 shows the basic components of an example cleaning unit in accordance within one or more embodiments;

FIGS. 3-4 illustrate emission of ultrasonic and RF emissions by a transducer arrangement and emitter arrangement of the cleaning unit;

FIG. 5 shows a cross-section through a further example cleaning unit according to one or more embodiments;

FIG. 6 shows an acoustic directing element comprised by example cleaning units in accordance with one or more embodiments;

FIG. 7 shows a further example cleaning unit, comprising protrusions at an exposed surface for a mechanical cleaning function and/or an acoustic transfer function;

DETAILED DESCRIPTION OF THE EMBODIMENTS

Figure 8:
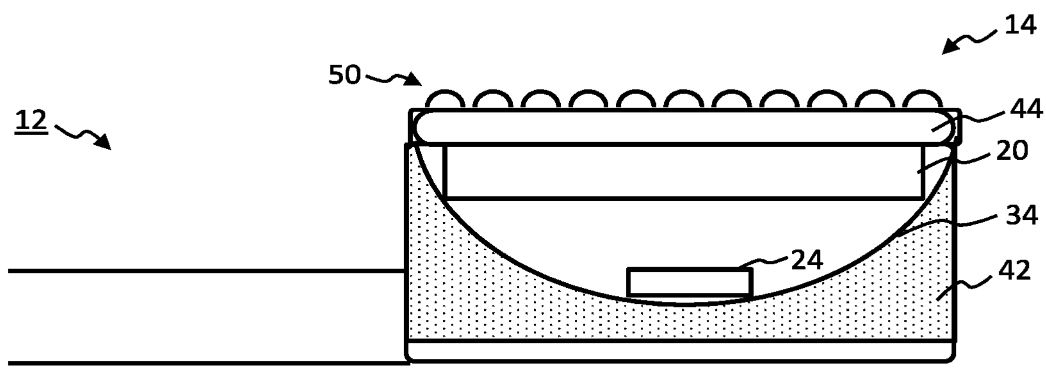
FIG. 8 shows a further example cleaning unit comprising protrusions at an exposed surface.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a surface cleaning means which is based on the combined use of ultrasound and radiofrequency electromagnetic emissions, propagated onto a surface to be cleaned, to provide synergistic cleaning action. One aspect provides a cleaning unit which comprises a body which includes an ultrasound transducer arrangement and an RF emitter arrangement, and wherein the two are arranged such that, when driven by respective drive signals, ultrasonic and RF electromagnetic emissions (for providing a cleaning action) are generated which overlap in a common spatial region, to thereby provide combined cleaning action in the common spatial region.

Optionally, in some embodiments, this can be combined with an additional mechanical drive mechanism arranged to induce sonic frequency oscillation or vibration of the cleaning unit body, which further enhances the cleaning effect. The mechanical oscillation further synergistically enhances the ultrasound cavitation. This provides a comprehensive cleaning effect.

One advantageous area of application for embodiments of the invention includes oral cleaning devices, particularly tooth cleaning devices. One field of tooth cleaning device is that of power toothbrushes.

Currently, the majority of power toothbrushes in the state of the art utilize sonic technology, wherein bristles are driven with oscillatory motion at sonic frequencies. The motor-driven sonic brushes typically offer 24,000-72,000 movements per minute, at a velocity around 1.5 m/s or higher, creating a reciprocating acoustic pressure and a shear stress to remove the dental plaque from the tooth enamel surface.

A small number of power toothbrushes have been proposed which use ultrasonic technology. In an ultrasonic toothbrush, a piezoelectric crystal emits a wave at a minimum frequency of 20,000 Hz or 1,200,000 pulses per minute to produce ultrasonic motions. Ultrasonic waves can be used to induce a cleaning effect through cavitation. In particular, where a liquid is present between the ultrasound source and the surface to be cleaned, the ultrasound wave induced cavitation creates numerous nano or microscopic-sized cleaning bubbles at the surface, which have the effect of loosening and removing debris and impurities. The cavitation thus has a surface abrasion effect In addition, bacterial chains which make up dental plaques may also be broken up by the high frequency, low amplitude ultrasound wave vibration. The ultrasound wave effects can operate even at regions not mechanically accessible to bristles, such as up to 5 mm below the gum line. Thus, while a sonic toothbrush requires the physical motion of the brush bristles to clean the teeth surfaces and gum line, the ultrasonic brush does not.

With regards to radiofrequency (RF) emissions, as discussed above, RF emission in some MHz ranges can produce dielectric heating. In particular, RF radiation is strongly absorbed by bound water comprised by calculus, and especially the hydroxyl groups of polysaccharides and glycoproteins, which are large components of pellicles, plaques, and calculus deposits. Due to very low specific heat of polysaccharides and glycoproteins, the absorption of the RF radiation can give rise to rapid heating and causes rapid temperature rising. This results in softening or 'melting' of the polysaccharides and glycoproteins. With regards to tooth deposits of pellicles, plaques, and calculus, the polysaccharides, glycoproteins and bound water effectively act as a 'cement/binder', and inorganic minerals (primarily of calcium phosphate crystals) effectively act as 'aggregates'. Thus melting or softening of the 'cement' binder has the effect of loosening or softening the pellicles, plaques, and calculus particles from tooth surfaces, making them easier to be removed mechanically, for example by oscillating bristles.

In operation, the RF heating induces penetrative and instantaneous heating of water, polysaccharides and glycoproteins. Under exposure to RF radiation, the dipole oscillations in water molecules (or the hydroxyl groups in polysaccharides and glycoproteins) lag temporally behind the oscillations of the field. The resulting interactions between the dipole and the field leads to an energy loss by heating. The extent of heating is dependent on the phase difference between the dipole oscillation and the fields. In water, the phase difference depends upon the strength and extent of the hydrogen-bonded network. In free liquid water, the movement of water's dipole occurs at GHz frequencies (microwaves) whereas in more restricted 'bound' water it occurs at MHz frequencies (short radiowaves) and in ice at kHz frequencies (long radio waves). Thus, for the purposes of stimulating heating of bound water in dental pellicles, plaques, and calculus deposits, electromagnetic emissions in the MHz radio frequency spectrum are the most appropriate. In particular, for embodiments of the present invention, RF emissions within the range of 1 MHz-300 MHz is preferred.

Embodiments of the present invention are based on combining use of radiofrequency electromagnetic emissions and ultrasonic acoustic omissions for a surface cleaning function. These have a synergistic interaction, since the radiofrequency emissions soften or melt the deposits on surfaces (for example dental plaques on dental surfaces), which then provides a more effective removal of these deposits using the cavitation effect induced by the ultrasonic emissions. Thus the radiofrequency omissions enhance the cleaning effect that would otherwise be provided by the ultrasonic omissions. Cleaning time may also be reduced as a result of this.

A further benefit of using the combination of radiofrequency and ultrasonic emissions is that the resulting cleaning device can be used with or without mechanical cleaning elements such as bristles. This is because the enhancement provided to the ultrasound cleaning effect by the radiofrequency omissions is sufficient to provide a highly effective surface cleaning function without necessarily needing mechanical scrubbing of surfaces, as has previously been required in state-of-the-art devices. However, addition of mechanical cleaning can further enhance the cleaning effect in embodiments of the invention.

Furthermore, with the application of the RF softening effect, the required amplitude and intensity of the ultrasound emissions, and of any mechanically driven cleaning elements which are provided, may be reduced without diminishing the cleaning effect.

In the particular application of oral cleaning devices, the combination of ultrasound and radiofrequency also has additional synergistic effects relating to stimulation of oral tissue. For example, RF emission enhances gingival tissue perfusion, which can provide a healing effect for inflamed gums.

FIGS. 1-2 show the basic components of an example cleaning unit 12 for a surface cleaning device in accordance within one or more embodiments.

The cleaning unit 12 comprises a body 14. The body may act as a housing for one or more components of the cleaning unit. The body may in some examples form a head portion of the cleaning unit, the head being disposed at a distal end of the cleaning unit, and coupled to a stein portion 13 leading away from the body. This is shown in FIG. 2.

The cleaning unit 12 further comprises an ultrasound transducer arrangement 20 carried by the body. In example of FIGS. 1-2, the ultrasound transducer arrangement is housed within the body 14. The ultrasound transducer arrangement comprises one or more ultrasonic transducers adapted to generate ultrasonic emissions 22 responsive to one or more drive signals. An electrical supply line (not shown) to the ultrasound transducer arrangement, for supplying the drive signal is further provided.

The cleaning unit 12 further comprises an electromagnetic (EM) emitter arrangement 24 carried by the body 14. In this example, the emitter arrangement is housed within the body 14. The electromagnetic emitter arrangement is adapted to generate radio frequency electromagnetic emissions 26 responsive to supply of a radiofrequency drive signal. By way of example, the emitter arrangement may comprise one or more conductive elements, operable to be driven with an alternating current or voltage, to thereby induce emission from the elements of electromagnetic radiation. However other examples are also possible, such as use of meta-materials.

The ultrasound transducer arrangement 20 and the emitter arrangement 24 are arranged for generation of ultrasonic emissions and EM emissions which overlap spatially, to permit simultaneous ultrasound and RF stimulation of a surface-to-be-cleaned 30. In operation, the emissions may be generated simultaneously, or drive signals may be supplied to the two arrangements in alternating fashion, but wherein there emissions are propagated into a spatial region which is common between the two, to thereby enable combined or co-operative stimulation of a common area of the surface to be cleaned.

The body 14 comprises a first outer surface forming a first face 16 of the body, the first face for positioning adjacent to surfaces to be cleaned during use. The transducer arrangement 20 and the electromagnetic emitter arrangement 24 are each arranged to generate emissions which propagate in a direction out from at least a portion of the first face 16.

This is illustrated schematically in FIG. 3 and FIG. 4. For ease of illustration, FIG. 3 schematically illustrates the electromagnetic emitter arrangement 24, isolated from other components of the cleaning unit. FIG. 3 illustrates the emitter arrangement 24 generating radio frequency electromagnetic emissions 26, responsive to supply of a radiofrequency drive signal (not shown). FIG. 3 further shows the transducer arrangement 20, comprising one or more ultrasonic transducers, and adapted to generate ultrasonic emissions 22 responsive to one or more drive signals. FIG. 4 schematically illustrates the cleaning unit in operation, with the emitter arrangement 24 and ultrasound transducer arrangement each being supplied respective drive signals to cause generation of the respective EM and ultrasonic emissions. As shown, the emitter arrangement and transducer arrangement are arranged such that the ultrasound emissions 22 and the RF emissions 26 escape the cleaning unit body 14 and propagate into a common spatial region, whereby a surface-to-be-cleaned 30 received within said region can be stimulated by the two emissions. The ultrasound and RF emissions can be generated simultaneously, or can be generated alternately, e.g. alternated in periodic fashion.

Although in the example of FIGS. 1-4, the ultrasound transducer arrangement 20 and the EM emitter arrangement 24 are housed or embedded within the body 14, this is not essential. In further embodiments, one or both of these elements may be carried on a surface of the body for example.

The cleaning unit may entirely passive, comprising only passive electronic components, and wherein active driving electronics are located within a separate unit, or a separate section of a cleaning device of which the cleaning unit forms a part. An aspect of this invention provides the cleaning unit alone, in the absence of the drive electronics or any remainder of a cleaning device of which it is a part.

The ultrasonic transducer arrangement 20 and the radiofrequency emitter arrangement 24 may each comprise an electrical supply line which is arranged to receive a respective drive signal during operation.

With regards to the ultrasound transducer arrangement 20, in different examples, this may comprise a single transducer element, or may comprise an array of transducer elements. Any type of ultrasonic transducer can be used. The most commonly used examples include transducers which operate using the piezoelectric effect or magnetostrictive effect.

By way of one example, ultrasonic waves can be generated by applying the output of an electronic oscillator to a thin wafer of piezoelectric material, such as lead zirconate titanate (PdZrTi or PZT). This thereby provides a simple and relatively low cost means of generating the ultrasonic waves.

Use of magnetostrictive transducers can be beneficial since these can produce high-intensity ultrasonic sound in the 20-40 kHz range.

A wide variety of piezoelectric PZT ceramic blends can be used to fabricate ultrasonic transducers suitable for use in the present invention. Any other transducer material may also be used, such as piezopolymers, such as single or multilayer polyvinylidene fluoride (PVDF), or crystalline piezoelectric materials such as lithium niobate (LiNbO3), quartz, and barium titanates (BaTiO3). The skilled person will be aware of a wide variety of options for implementing ultrasonic transducers.

The ultrasound transducer arrangement may comprise an array of transducer elements, where the array occupies a flat plane, or occupies a curved or contoured plane or surface. Providing a curved array allows for focusing of ultrasonic waves for example.

In general, ultrasonic transducers can be driven based on supply to the transducer of a drive signal in the form of an alternating current or voltage. This induces the transducer to expand and contract, primarily along one axis, and at or near resonance with the frequency of the supplied drive signal. This thereby converts electrical energy into ultrasonic energy.

With regards to the EM emitter arrangement, this may comprise an arrangement of one or more conductive elements which, when supplied with an alternating drive signal, are adapted to emit electromagnetic radiation, or an alternating electromagnetic field (i.e. electromagnetic emissions). The frequency of the EM emissions may match the frequency of the alternating drive signal. In other cases, the EM emitter arrangement may form part of a resonator circuit, which includes a resonant capacitor and wherein the frequency of the EM emissions can be tuned by tuning the resonance frequency of the resonator circuit.

The one or more conductive elements may comprise one or more electrodes, or may comprise one or more conductive coils.

In some embodiments, as an alternative to use of conductive elements, the emitter arrangement may comprise elements formed of a metamaterial, or an electroactive material, or any other material which is capable of generating electromagnetic emissions responsive to application of an electrical drive signal.

In operation (and as will be described further below), the emitter arrangement may, in accordance with one or more embodiments, be driven with a drive signal having a frequency between 1-300 MHz.

Although the various examples described above (and in more detail below) include only an EM emitter arrangement, in accordance with any of the discussed embodiments, the cleaning unit may also comprise means for sensing electromagnetic emissions. This may be facilitated by provision of one more EM sensing elements. In other examples, the same EM emitter arrangement can be used for the sensing, for example based on monitoring changes in electrical characteristics of the drive signal applied to the emitter arrangement.

The sensing can be used in accordance with one or more embodiments for sensing presence of surfaces or objects within the emitted EM field of the emitter arrangement. This changes the characteristics of the EM field, which is thereby detectable in changes to the electrical characteristics of the drive signal to the emitter arrangement. The sensing may additionally or alternatively be used to sense a clean level of the surface being cleaned, again based on changes in electrical characteristics of the drive signal.

However, inclusion of sensing functionality is not essential, and may either be included or omitted in any of the embodiments described herein.

The frequency of the RF radiation is different from that of the ultrasonic emissions (and also of any possible sonic vibration of cleaning element), hence no wave interference occurs between them.

FIG. 5 schematically illustrates a further example cleaning unit 12 in accordance with one or more embodiments. All of the features and options outlined above in relation to the cleaning unit of FIGS. 1-4 can also be applied to the cleaning unit of FIG. 5.

In the example of FIG. 5, the cleaning unit body 14 comprises an acoustic wave directing element 34 arranged to receive at least a portion of the ultrasonic emissions 22 generated by the ultrasound transducer arrangement 20 and to redirect the emissions along a pre-defined one or more propagation paths, directed out of and/or away from the body 14. The acoustic wave directing element may be an acoustic reflector element.

The acoustic wave directing element 34 may comprise a concave redirection surface structure, and with the ultrasound transducer arrangement arranged such that generated ultrasound waves are received on the concave surface. The concave surface is adapted to reflect received acoustic waves (at least within the ultrasound frequency range). The concave surface is oriented such that the reflected waves are directed along one or more propagation paths that take the waves to a the common spatial area outside of the body 14 within which also the RF waves are adapted to be propagated during operation.

The acoustic wave redirecting element 34 may for example take the form of a parabolic acoustic reflector 34.

The acoustic wave directing element 34 may in some examples be adapted to focus received ultrasound emissions into an ultrasound beam or focused ultrasound path, for providing focused ultrasound energy onto a localized spot or area of a surface to be cleaned. Although a single acoustic wave directing element 34 is shown in FIG. 5, in further examples a plurality may be provided.

The acoustic wave directing element 34 has the effect of reducing loss of ultrasound energy out through one or more boundaries of the cleaning unit body 14 located behind the reflecting surface of the redirecting element. In the example of FIG. 5, ultrasound waves are inhibited from escaping through a reverse side reverse side 17 of the cleaning unit body 14. This is a side opposite to the front face 16 of the body through which RF and ultrasound emissions are intended to be emitted in operation. The redirection element further provides for collection of ultrasound energy and direction of this energy to a controlled and predictable spatial region outside of the cleaning unit body 14.

In some examples, the cleaning unit 12 may be used in association with a cleaning device which is adapted to induce a mechanical oscillation of the cleaning unit at sonic frequencies. The acoustic redirecting element 34 may be adapted so as to additionally provide a function of re-directing sonic vibration waves. This is possible since sonic and ultrasonic waves obey the same acoustic reflection laws. Thus, vibration waves applied to the body can be directed along a similar direction as the ultrasound waves, toward the front face 16 of the cleaning unit body 14. This further boosts loosening and removal of plaques and extrinsic stains. Thus, the reflector may boost the synergistic dual-cleaning effect of ultrasound wave and sonic vibration in these examples.

In preferred examples, the acoustic wave directing element 34 may be adapted to reflect at least 95% of received acoustic waves in the one or more output path directions.

The space between the acoustic wave directing element 34 and the ultrasonic transducer arrangement 20 may be filled with an acoustically conductive material to aid efficient propagation of the ultrasound waves between the transducer arrangement 20 and the wave directing element 34.

Materials and methods and construction of an acoustic directing element, particularly an acoustic reflector, will be well to the person skilled in the art. By way of example, suitable acoustic reflectors which may be employed in embodiments according to the present invention are outlined in documents: U.S. Pat. Nos. 4,146,869A, 3,881,056A, 6,417,602, and US20020197182A1.

FIG. 6 shows an example acoustic wave directing element 34 in operation. The acoustic wave directing element is in the form of a concave acoustic reflector. The ultrasound transducer arrangement 20 is arranged to direct ultrasound emissions 22 onto the concave surface of the reflector element 34. The ultrasound emissions 22 are reflected from the concave surface. Due to its concave shape the waves are collected or focused into an ultrasound beam which propagates in a direction away from the concave surface of the reflector element. The focused ultrasound waves thereby exit the body 14 of the cleaning element 12 and can be received on a localized region of a surface-to-be-cleaned 30.

In advantageous examples, the body 14 of the cleaning unit may further comprise an ultrasound shield component 42 arranged to inhibit propagation of ultrasound waves out from the body in one or more directions. The ultrasound shield component is formed of an acoustically attenuating material, to inhibit escape or leakage of ultrasound waves from the body in one or more directions in which they are not intended during operation. By way of example, this may be useful in oral cleaning applications for preventing ultrasound propagation out of surfaces of the cleaning unit body which, in use, face toward non-targeted oral surfaces and tissues, for example a back of a toothbrush head.

For example, in the embodiment shown in FIG. 5, the shielding component 42 is arranged to inhibit escape of ultrasound waves from a rear face 17 of the body 14. The rear face is on opposite side of the body to a front face 16 of the body, through which ultrasound and RF waves are arranged to be omitted.

By way of one example, the ultrasound shield component 42 may be comprised of a foam material. Foam material naturally includes a plurality of air or other gas bubbles. Ultrasound transmits very poorly through a gaseous medium. Thus foam provides a good attenuation material. In some embodiments, the shield component may comprise multiple layers of different materials, each material having a differing acoustic impedance. In some embodiments, the shield component may further comprise one or more active components, such as energy diversion devices, or heating, cooling, monitoring, and/or sensing elements.

In the example of FIG. 5, the ultrasound shielding component 42 is placed behind the reflecting surface of the acoustic directing element 34.

In one or more embodiments, the acoustic directing element 34 and the shielding component 42 may be integrally formed as a single piece. In some examples, the ultrasound transducer arrangement 20, the acoustic directing element 34, and the ultrasound shielding element 42 may all be formed as a single integral piece. This provides for ease of manufacture, and greater robustness against damage or degradation over time.

In accordance with one or more embodiments, the cleaning unit 12 may further comprise an impedance matching layer 44 positioned between the first outer face 16 of the cleaning unit body 14 and an output surface of the ultrasound transducer arrangement 20. This is illustrated in the example of FIG. 5.

An impedance matching layer assists in optimally acoustically coupling the ultrasonic energy from the ultrasound transducer arrangement 20 to the front face or surface 16 of the cleaning unit body 14. Optimal impedance matching may be achieved at least in part based on selecting a thickness of the impedance matching layer 44 to be approximately ¼ of the intended wavelength of the ultrasonic omissions to be generated by the ultrasound transducer arrangement 20 in use.

The chosen material and structure of the impedance matching layer 44 should be such as to minimize interference with the radiofrequency electromagnetic emissions of the EM emitter arrangement 24. It is preferably made of durable materials, to enable it to withstand for example repeated knocking of the front face 16 of the body against surfaces to be cleaned 30 during operation.

One or multiple impedance matching layers 44 may be provided. A multilayer impedance matching component can improve the efficiency of acoustic transfer, particularly when transmitting from the commonly high impedance materials which form an ultrasound transducer into typically significantly lower impedance materials which form a the body of a cleaning unit 14. By way of non-limiting example, appropriate materials for the impedance matching layer 44 or component may include epoxy, graphite, or others known to the skilled person.

As discussed above, most commonly, cleaning units comprise protruding cleaning elements for performing a mechanical cleaning function. For example many cleaning units comprise bristles or other protruding cleaning filaments for rubbing against tooth surfaces, for providing a scrubbing effect, to thereby remove deposits from surfaces.

Due to the synergistic interaction between the ultrasonic emissions and the radiofrequency emissions, a subset of embodiments of the present invention may be provided without such mechanical cleaning elements. For example a bristleless surface cleaning unit can be provided.

According to a further set of embodiments, an arrangement of very short cleaning elements can be provided protruding from an emission output face 16 of the cleaning unit. A height of the cleaning elements is preferably small, so as to minimize attenuation of ultrasound waves being acoustically transmitted between a front face 16 of the cleaning unit and a surface-to-be-cleaned 30 during operation.

Various options relating to mechanical cleaning elements of the cleaning unit in accordance with one or more embodiments will now be outlined in more detail, starting with a brief background to the problems addressed by various advantageous embodiments.

As discussed above, typical cleaning units in the state-of-the-art are provided with relatively long cleaning elements or filaments, such as bristles, allowing for scrubbing of surfaces. The presence of such long cleaning elements causes a number of detrimental effects within the context ultrasound emitting devices, and in the context of sonic frequency vibration. In particular, long bristles mean that there is a large spatial distance between and output face of the cleaning unit, at the base of a bristle field, and the distal ends of the bristles which make operative contact with the surface to be cleaned. This results in a large air-space between the ultrasonic output surface of the unit and the surface to be cleaned, which causes a high degree of ultrasonic attenuation for waves travelling through the air space. Furthermore, the typical soft material of cleaning bristles is a poor acoustic conductor, and also leads to excessive acoustic attenuation.

In more detail, within acoustics, sonic and ultrasonic sound typically propagate as vibration waves of pressure, through a gas, liquid or solid transmission medium.

All acoustic waves obey a common set of physical properties which include laws of reflection, refraction, diffusion, absorption and attenuation. In a fluid environment, ultrasound waves are restricted to longitudinal propagation; for a solid material, the waves may be either longitudinal or transverse (or a combination of the two). Longitudinal ultrasound waves are transmitted in a straight line and can be focused. Ultrasonic waves are gradually attenuated as they travel spatial distance through the medium that they travel.

According to Newton-Laplace equation, $c=\sqrt{K/\rho}$, the speed of sound, c, is proportional to the square root of the ratio of the bulk modulus, K, of the medium to its density, ρ.

Thus, sound travels faster in mediums with lower elasticity such as steel and iron. In more elastic mediums such as rubber, plastics and fiberglass, sound travels slower. These mediums easily deform when forces are applied. Sound waves are attenuated and/or absorbed when passing through solids that are easily deformed when a force is applied. In general, the stiffer the medium, the faster sound will travel through.

However, most commercially available surface cleaning devices, particularly most tooth-brushing devices, use brush-heads comprising soft bristles. In the field of oral cleaning, the soft bristles used in most devices have the following typical properties.

Firstly, the bristles are commonly made of durable nylon (with density $\rho\sim1.15$ g/cm$^3$) with relatively low bulk modulus, and with a typical length of between 5-12 mm. The soft material means the bristles would be relatively highly attenuating of any propagated ultrasound waves. Furthermore, the relatively long length of the bristles would also result in high attenuation, due to the longer path length the wave is forced to travel, both when propagating along the bristle solid material itself, and through the spaces between the bristles.

Secondly, due to the relatively long length of the bristles, during use, the majority of the length of the spaces between clusters of bristles and individual bristles is filled with air rather than liquid. This air gap also adds to ultrasonic attenuation. In particular, compared for example to steel (solid, ~160 GPa), water (liquid, ~2.2 GPa) and rubber (plastic, ~1.5-2.0 GPa), the adiabatic bulk modulus of air (~142 kPa) is so low that it has significant negative impact on sound wave propagation. This air space between bristle tufts and bristles prevents ultrasonic induced cavitation from taking place on a targeted part of the tooth.

The above two characteristics contribute to the rapid attenuation of ultrasonic propagation, which in turn results in weaker ultrasonic wave vibration & cavitation, and also weaker sonic vibration transmission (where this is provided). This thereby has an impact on the surface (e.g. tooth) cleaning efficacy.

According to at least one set of embodiments of the present invention, the above problems may be at least partially overcome by using a cleaning unit 12 which is bristleless or comprises only short mechanical cleaning elements (e.g. short bristles or dots). These are preferably less than or equal to 5 mm in height from the surface which carries them.

FIG. 7 schematically illustrates one example in accordance with one or more embodiments. FIG. 7 shows just the body 14 of an example cleaning element 12. FIG. 8 shows a further example in accordance with one or more embodiments. The example embodiment of FIG. 8 comprises the same components and features as the example of FIG. 5, described above, but with the addition of an arrangement 50 of protrusions 52.

For both the examples of FIG. 7 and FIG. 8, the body 14 comprises a first outer face 16. The ultrasound transducer arrangement 20 is arranged such that ultrasonic emissions 22 generated in operation propagate out from at least a portion of the first face. The wherein the first face 16 carries an arrangement 50 of protrusions 52 extending outwardly from the first face. The protrusions are for making operative contact with a surface-to-be-cleaned 30 during use. This may be for enabling a mechanical cleaning action for example. The protrusions may also provide an ultrasound coupling function. The protrusions extend to a maximum height, h, from the first face of less than or equal to 5 mm.

By providing the protrusions 52 at a height of 5 mm of less, this significantly minimizes the distance over which ultrasonic emissions must travel between the output face 16 of the cleaning unit body 14 and a surface to be cleaned in operation. If the cleaning unit is positioned in use with the distal tips of the protrusions in contact with the surface to be cleaned, the distance is kept to below 5 mm. This thereby reduces ultrasonic attenuation.

The protrusions may take the form of bumps, bosses, dots (e.g. microdots), ridges, blunted spikes, bristles, filaments, or any other form or shape of protrusion. The protrusions are for contacting surfaces to be cleaned. They may be used to provide a mechanical cleaning function based on rubbing of the protrusions over the surface to be cleaned. In other examples they may simply provide an acoustic transfer function, enabling operative acoustic coupling with a surface to be cleaned.

By providing only short protrusions, instead of a bristle field comprising long bristles, less waste is generated for landfill. The shorter protrusions are also less liable to fraying and wear than long bristles, so lifetime may be extended.

Long bristle fields are also a significant source of growth and exponential spread of pathogenic microorganism, particularly if the cleaning unit is stored in a relatively wet, room temperature environment. Thus, shorter cleaning elements help to reduce the available space for microorganisms to grow and multiply.

The protrusions may all be at the same height, or may differ in height. For example, the distal ends of the protrusions may define an upper surface profile or envelope which may vary in height, and wherein a maximum height of the upper surface profile or envelope from the first surface is no greater than 5 mm.

The shorter the protrusions, the shorter the distance over which ultrasonic emissions must travel between the output face 16 and the surface being cleaned 30. Thus the less attenuation is caused to the ultrasound emissions. However, it is for many applications beneficial to include protrusions which have some height, since these provide abrasive effect when rubbed against the surface, which aids with surface cleaning. A height of ≤5 mm is preferred since it optimizes sufficient height to provide an abrasive effect, with minimizing the attenuation of the ultrasound waves. Furthermore, for cleaning applications in which a fluid cleaning agent is applied between the output face 16 and the surface-to-be-cleaned 30 (e.g. toothpaste for oral cleaning applications), a spacing of ≤5 mm is typically small enough that the fluid cleaning material will completely fill the spacing between the protrusions during use, thereby enhancing acoustic conduction by eliminating the air gap between the output face 16 and the surface-to-be cleaned. For example, for the case of oral cleaning applications, the height of a pea-size quantity of toothpaste is generally ≤5 mm.

The protrusions 52 in accordance with one or more examples may for instance have a diameter between 0.1-2.0 mm, preferably 0.5-1.0 mm. The height may be less than or equal to 5 mm, preferably 0.3-4.0 mm, and more preferably 2.5-3.5 mm.

In some examples, each protrusion may be an integrally formed structure, i.e. is monolithic.

The protrusions may be curved or rounded in their outer shape. However, this is not essential and in further examples the protrusions may have a different shape, e.g. comprising straight-edge sides. For example, the protrusions may define a polygonal shape in a cross-section parallel with the output surface 16.

The protrusions may take the form of bumps, each bump being an integrally formed structure. The protrusions in some examples may take the form of dots (microdots).

The plurality of protrusions may be formed of the same or different materials, and may have the same or different textures, sizes and shapes. The arrangement 50 of protrusions 52 may comprise by way of example >100 protrusions. The arrangement 50 may form a regular array, or a non-regular formation.

The protrusions may in some examples take the form of ridges which are 5 mm or less in height, for example 0.5-4.0 mm in height.

In some examples, the arrangement 50 of protrusions 52 and the outer surface portion 16 which carries them may be integrally formed as a single piece. This can be achieved for example through techniques such as molding, or via 3D printing. This provides for a more simple manufacture compared to bristles.

In the case of oral cleaning application, the protrusions are short enough that, during operation, the spaces between the protrusions 52 or short bristles would become mostly filled by fluid (e.g. saliva, water) and toothpaste during brushing. Thus, not only does the short length reduce the acoustic path length to surfaces to be cleaned, it also better ensures that the path length which remains is optimally filled with fluid, improving acoustic transmission (compared to air).

In accordance with one or more embodiments, the protrusions are may be formed of a material having a Shore A Scale hardness of between 5 to 120, preferably 10 to 100, and more preferably from 20 to 70. As discussed above, materials which are too soft lead to excessive attenuation of ultrasound waves. Forming the protrusions of relatively harder materials improves ultrasonic transmission through the protrusions to the surface to be cleaned. The above-defined ranges of hardnesses have been found to provide an optimal balance between the minimizing of acoustic attenuation, while not compromising the general resilience of the protrusions against cracking or breaking due to excessive brittleness.

In addition, as mentioned above, bristles on more typical cleaning units (e.g. as comprised by powered toothbrush devices) are commonly made of durable, non-biodegradable nylon. The normal lifespan of a brush head is around 3-6 months and billions of electric brush heads with worn-out bristles are disposed of into landfill each year. The shorter and more durable protrusions, or shorter bristles, reduce the amount of waste that is generated.

In accordance with one or more embodiments, the protrusions 52 be formed of biodegradable polymers such as cellulose plastic to reduce long-term environmental impact.

Although in the example of FIG. 7, the cleaning unit body 14 comprises protrusions on only a single face, in further examples the protrusions may be provided on multiple sides.

In accordance with one or more embodiments, the surface portion which carries the arrangement 50 of protrusions 52 may be a surface of a detachable portion of the cleaning unit body. This allows for replacement of the protrusion arrangement 52 without replacement of the remainder of the cleaning unit body 14 (containing the transducer arrangement 20 and the EM emitter arrangement 24).

Figure 9:
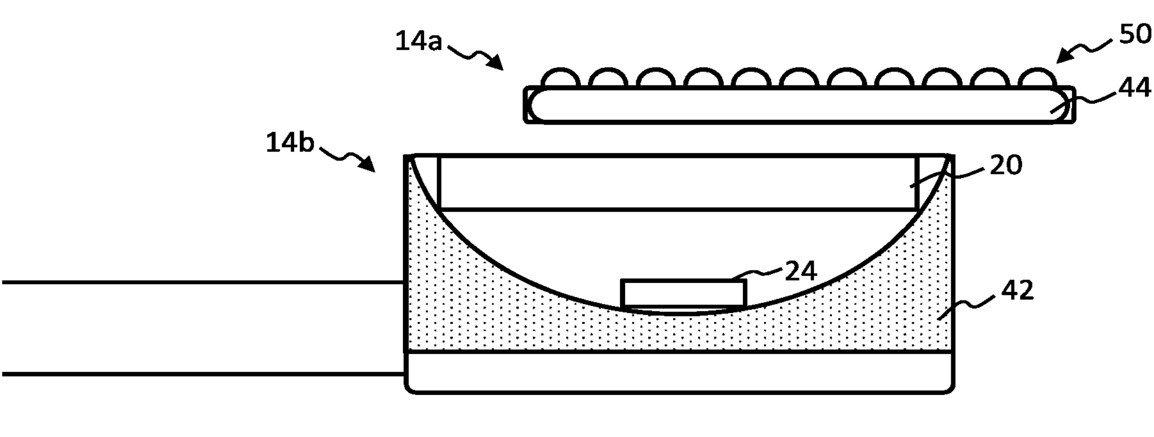
FIG. 9 shows a further example cleaning unit having two separable sections, one of the sections carrying cleaning protrusions, and the other containing the transducer arrangement and emitter arrangement.

An example is schematically illustrated in FIG. 9. In this example, the cleaning unit body 14 comprises at least a first 14*a* and second 14*b* section, wherein the first face 16 of the cleaning unit (the emission output face) is comprised by the first section. The first section is adapted to be releasably attachable and detachable from the second section. The second section 14*b* comprises the transducer arrangement 20 and the emitter arrangement 22.

Using the detachable design, the arrangement of protrusions can easily be attached or secured to the body 14 of the cleaning unit 12, and easily removed for replacement when worn out. Physical attachment means between the two may include for example a slide-lock arrangement, push-fit, snap fit, zip or any other suitable physical retention mechanism. Thus, when the protrusion arrangement 50 is worn out, it can easily be disposed of and occupies less volume in landfilling, and does not require replacement of the transducers and the EM emitter.

The first section 14*a* may be an integrally formed structure in some examples (i.e. monolithic). This means that the arrangement 50 of protrusions 52 is integrally formed with the surface 16 from which they protrude.

The examples illustrated in FIGS. 1-9 show examples in which the cleaning unit is arranged such that ultrasound and RF emissions are propagated from the cleaning unit body 14 from a single face of the body and in a single general transmission direction. In accordance with one or more embodiments, the ultrasound transducer arrangement 20, the emitter arrangement 24 and/or the body 14, may be arranged such that the ultrasound and/or RF emissions are propagated from the body in more than one direction. The emissions may be emitted in directions which span 360 degrees around the body in some examples.

Figure 10:
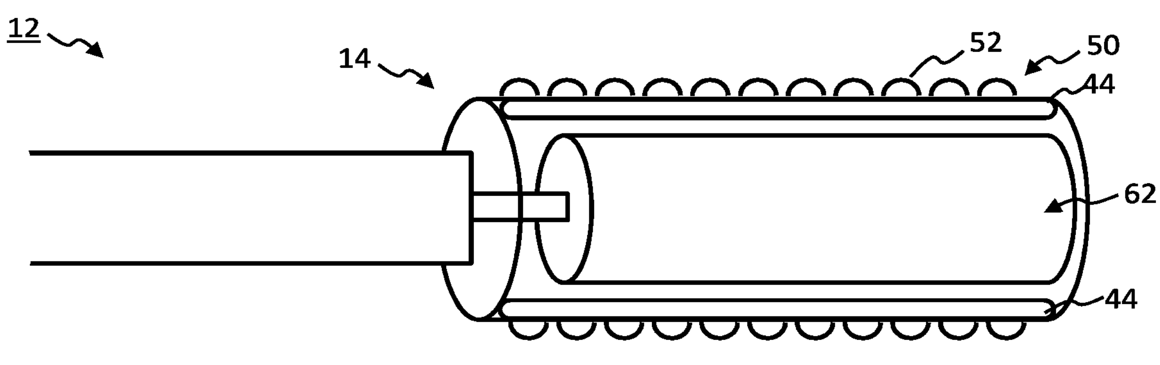
FIG. 10 shows a further example cleaning unit having a tubular form for emitting ultrasound and/or RF waves in a plurality of directions.

One example is illustrated in FIG. 10.

In this example, at least a portion of the body 14 of the cleaning unit 12 is tubular. The body comprises an outer surface which is tubular, and wherein said outer surface forms an RF and ultrasound emission output face. The ultrasound transducer arrangement 20 (not shown) is arranged such that the ultrasound emissions are propagated away from the output face in a plurality of directions. The EM emitter arrangement (not shown) may also be arranged such that RF emissions are propagated away from the output face in a plurality of directions.

By way of example, the body 14 may comprise an inner tubular support structure 62 arranged to carry, support or house one or both of the ultrasound transducer arrangement 20 and the EM emitter arrangement 24.

By way of example, the ultrasound transducer arrangement (not shown) may comprise a plurality of transducer elements mounted at a range of angular positions around the tubular support structure 62 such that ultrasound emissions are propagated in a range of directions from the body 14. The same may be true for the EM emitter arrangement: a plurality of EM emitter elements may be provided at a range of different angular positions around the tubular support structure 62, such that in operation, RF emissions may be emitted from the body 14 in a plurality of different directions.

The ultrasound transducer elements may be arranged in an annular or tubular array by way of example.

Optionally, an acoustic wave directing element may additionally be provided. For example, a cylindrical or tubular acoustic wave reflecting element may be provided coaxially inset relative to the (e.g. annular) arrangement of the ultrasonic transducers, i.e. radially inset behind to the ultrasound transducer arrangement. In other words, the tubular acoustic reflecting element may be arranged encircling an axial center of the cleaning unit body 14, and arranged radially between the arrangement of ultrasound transducer elements and the axial center of the body 14. This provides for an ultrasound reflection action in 360° around the body.

Although provision of a tubular support structure 62 is shown in FIG. 10, this is not essential, and the ultrasound transducer arrangement and EM emitter arrangement could be supported or mounted within the tubular body in a different way, e.g. with a frame structure, or using struts.

In the example shown in FIG. 10, the cleaning unit body 14 comprises an arrangement 50 of protrusions 52 carried on the tubular outer surface of the device. The arrangement of protrusions thus forms a tubular or annular array of protrusions. Any of the options or features outlined above in relation to the arrangement of protrusions may be applied equally to examples of the present embodiment.

A tubular shaped cleaning unit body may have particularly advantageous application for nonhuman uses, for example for cleaning the interior surfaces of tubes or pipes.

In operation, optionally, a mechanical movement generator may be used to drive oscillation of the cleaning unit body. This may be for inducing oscillation or vibration of distal tips of the protrusions, to enable them to perform a mechanical cleaning action when applied against a surface to be cleaned. By way of example, sonic frequency oscillation of the cleaning unit body 14 may be applied.

In the context of nonhuman applications, the radio frequency emissions generated upon supply of a drive signal to the EM emitter arrangement may achieve dielectric heating of surface deposits such as organic soils having bound water and/or hydroxyl groups.

In accordance with one or more embodiments, for nonhuman applications, the cleaning unit may comprise additional functional components or features to aid the cleaning function, such as a vacuum, a chemical spray, or one or more sensors for guiding positioning of the cleaning unit relative to surfaces and sensing progress of cleaning.

Examples in accordance with a further aspect of the invention provide a surface cleaning device 70.

The provided surface cleaning device may comprise a cleaning unit 12 in accordance with any example or embodiment outlined above or described below, or in accordance with any claim of this application. In other examples, the provided surface cleaning device may be adapted in use to be electrically and mechanically coupleable to, a cleaning unit 12.

Figures 11, 12, 13:
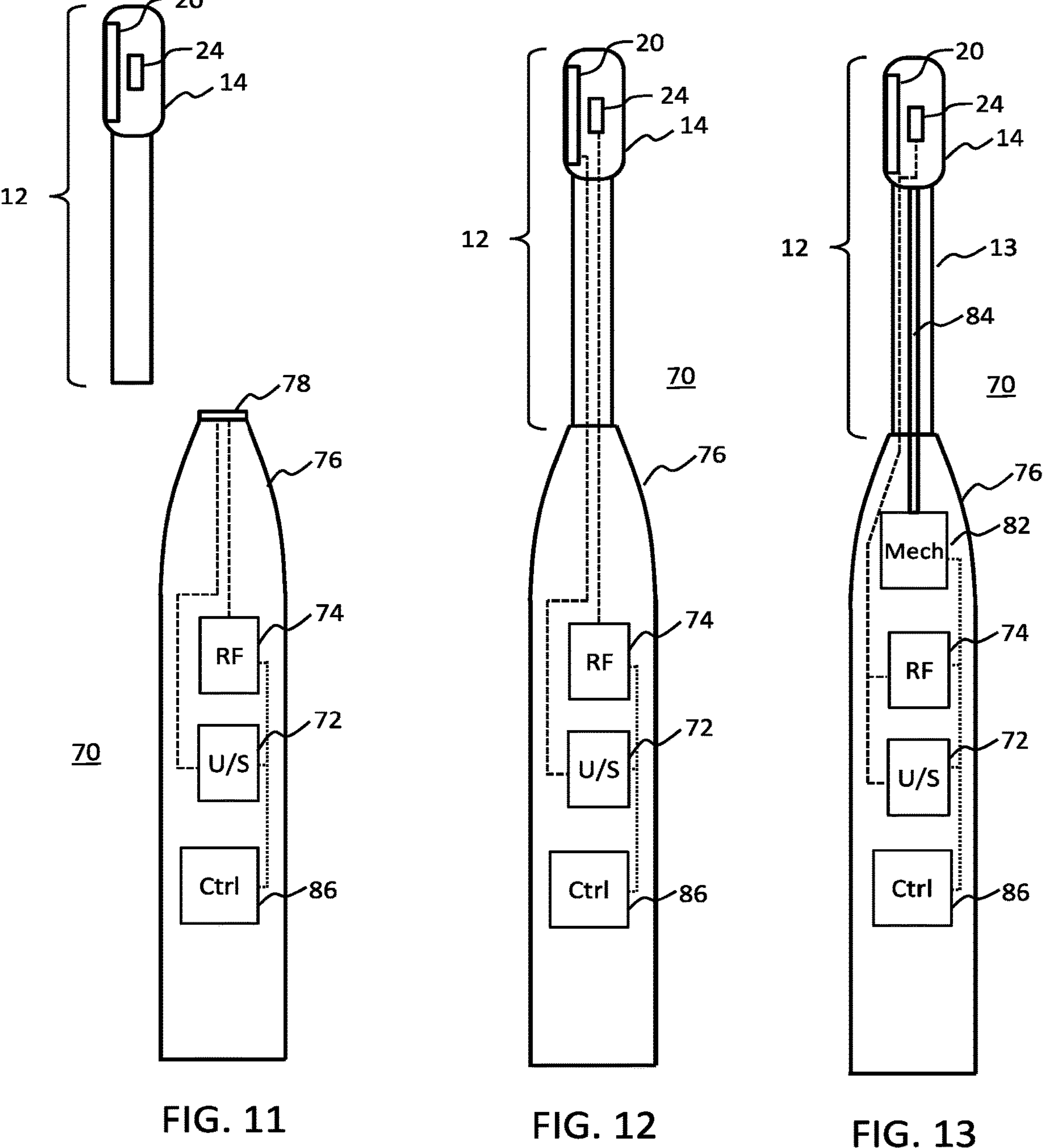
FIGS. 11-13 show different example cleaning devices, comprising cleaning units in accordance with one or more embodiments.

An example is shown in FIG. 11. The cleaning device comprises an ultrasound driver module 72 operable to generate one or more drive signals for driving generation of ultrasonic emissions when the drive signals are coupled to an ultrasound transducer arrangement 20. The cleaning device further comprises a signal generator 74, adapted to generate an alternating drive signal for driving generation of radiofrequency emissions when the drive signals are coupled to an electromagnetic emitter arrangement 24.

Preferably, the cleaning device further comprises a controller 86 operatively coupled with the ultrasound driver module 72 and signal generator 74 and adapted to control simultaneous activation of the ultrasound drive module and signal generator for simultaneous generation of the ultrasound drive signal and alternating RF drive signal. This allows, in operation, for simultaneous generation of RF and ultrasonic emissions. Alternatively, the controller may be adapted to control the ultrasound driver module 72 and the signal generator 74 to generate There may further be provided a signal interconnection arranged to provide a fixed or releasable electrical interconnection between the ultrasound drive module 72 and a cleaning unit 12 which comprises an ultrasound transducer arrangement 20. The signal interconnection may include one or more wire interconnects.

In cases where the cleaning device is adapted to be releasably coupleable to a cleaning unit 12, the device may include an electrical connector 78 adapted to mate electrically with a reciprocal electrical connector of the cleaning unit when the cleaning unit is coupled to the device, the mated electrical connectors establishing an electrical interconnection between the driver and generator in the device and the transducer arrangement and emitter arrangement in the cleaning unit.

FIG. 11 shows an example in which the cleaning unit 12 is releasably coupleable to a base unit 76 of the cleaning device having a housing containing the ultrasound driving module 72 and the RF signal generator 74 of the cleaning device as described above.

FIG. 12 shows an example in which the cleaning unit 12 is fixedly attached (e.g. integrally attached) to the base unit 76 of the cleaning device 70.

FIG. 13 shows a further example cleaning device 70, wherein the cleaning device further comprises a mechanical drive mechanism 82, operable to provide a source of sonic frequency oscillatory movement, and a mechanical coupling arm 84 for coupling the sonic oscillatory movement to the cleaning unit 12.

The mechanical coupling arm 84 extends from a top of the base unit 76 and is arranged to extend through, or be received through, an interior cavity of a stein section 13 of the cleaning unit 12 of the cleaning device. The stein section is coupled at a distal end to the body 14 of the cleaning unit (e.g. head portion).

The mechanical coupling arm couples the sonic movement to the body 14 of the cleaning unit. This allows, in operation, for a synergistic combination of RF softening of surface contaminants, ultrasound-induced cavitation at the surface-to-be-cleaned, and mechanical agitation action (e.g. scrubbing or abrasion, for instance using an arrangement of protrusions 52 on the surface of the cleaning unit body).

A controller 86 may further be provided, adapted to control the ultrasound driver module 72, the signal generator 74 and the mechanical drive mechanism 82 to operate simultaneously or alternately during operation of the device.

The stein section 13 of the cleaning unit 12 may further comprise interconnection wiring to provide electrical interconnection between the ultrasound driving module 72 and the RF signal generator 74 in the base unit 76 and the ultrasound transducer arrangement 20 and the EM emitter arrangement 24 in the cleaning unit body 14.

In accordance with any of the example cleaning devices 70, the base unit 76 of the cleaning device may further comprise a rechargeable power source, such as a battery, to provide a source of electrical power for the ultrasound driving module 72 and the RF signal generator 74.

The cleaning device 70 may be an oral cleaning device for performing cleaning of oral surfaces.

When utilized orally, the combined ultrasound and RF emissions advantageously allow for cleaning in areas which are mechanically inaccessible, e.g. gingival and sub-gingival regions. Thus, oral cleaning and consequently oral health can be improved.

In addition to performing a cleaning function, when utilized orally, the combined used of ultrasound and radio frequency emissions enable a range of advantageous treatment effects. For example, RF emission enhance gingival tissue perfusion, which can provide a healing effect for inflamed gums. For example, the RF waves provide for fibroblast recruitment, and the ultrasound waves provide for collagen-type conversion. These provide complementary parts of the same healing general response, but the two energies of tissue repair synergistically enhance or boost one another.

Furthermore, as the RF emissions remove minerals from tooth surfaces and pull them back into solution, osteocytes are able to recycle these towards re-calcification. Re-calcification has benefits of reducing tooth sensitivity performing erosion repair. This effect can be achieved also at mechanically inaccessible regions such as below and near the gum line.

In preferred examples, the signal generator 74 may be adapted (or controlled) to generate a drive signal within the frequency range of 1 MHz-300 MHz, for causing emission by the EM emitter arrangement 24 of EM emissions in the frequency range 1 MHz-300 Mhz.

The ultrasound driver module 72 may be adapted (or controlled) to generate a drive signal for causing generation of ultrasound emissions in a frequency range of 20 kHz-300 MHz. In accordance with one set of embodiments, the device is for human use and wherein the ultrasound driver module is adapted (or controlled) to generate a drive signal for causing generation of ultrasound emissions of less than 10 MHz.

In accordance with one set of embodiments, the device may be for non-human use, and wherein the ultrasound driver module is arranged to generate drive signals for generating ultrasound emissions at a frequency of 10 MHz or higher. These frequencies may not be safe for human use, but for non-human use may provide for more intensive cavitation and therefore cleaning effects.

Examples in accordance with a further aspect of the invention provide surface cleaning method comprising simultaneously applying ultrasound emissions and RF frequency electromagnetic emissions to a surface to be cleaned.

The method may further comprise mechanically scrubbing the surface-to-be-cleaned simultaneously with the application of the ultrasound emissions and RF frequency electromagnetic emissions.

The method is preferably performed with a layer of water or other liquid disposed between surface-to-be-cleaned and at least an acoustic output surface the ultrasound transducer arrangement.

In more particular embodiments, the method may comprise controlling emission of ultrasound emissions and radio frequency electromagnetic emissions from a cleaning unit, for a surface cleaning device.

In this set of embodiments, the method may comprise supplying one or more drive signals to a transducer arrangement comprised by a body of the cleaning unit, the transducer arrangement comprising one or more ultrasonic transducers. The drive signal are adapted to cause generation of ultrasonic emissions by the transducer arrangement.

The method may further comprise supplying one or more radiofrequency drive signals to an electromagnetic emitter arrangement comprised by the body of the cleaning unit, the electromagnetic emitter arrangement. The drive signals are adapted to cause generation of radio frequency electromagnetic emissions by the emitter arrangement.

The ultrasound transducer arrangement and the emitter arrangement are arranged for generation of ultrasonic emissions and EM emissions which overlap spatially, to permit simultaneous ultrasound and RF stimulation of a surface-to-be-cleaned 30.

As discussed above, embodiments make use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A cleaning unit for a surface cleaning device, the cleaning unit comprising:
- a body;
- an arrangement of protrusions or cleaning elements on a face of the body, for making operative contact with a surface-to-be-cleaned during use, for enabling a mechanical cleaning action;
- an ultrasound transducer arrangement carried by the body, the transducer arrangement comprising one or more ultrasonic transducers adapted to generate ultrasonic emissions responsive to one or more drive signals;
- an electromagnetic emitter arrangement carried by the body, the electromagnetic emitter arrangement adapted to generate radio frequency electromagnetic emissions responsive to supply of a radiofrequency drive signal;
- wherein the ultrasound transducer arrangement and the emitter arrangement are arranged for generation of ultrasonic emissions and EM emissions which overlap spatially, to permit simultaneous ultrasound and RF stimulation of a surface-to-be-cleaned,
- wherein the body comprises an acoustic wave directing element arranged to receive the ultrasonic emissions from the ultrasound transducer arrangement and to redirect the emissions along a pre-defined one or more propagation paths out from and/or away from the body, and
- wherein the acoustic wave-directing element is adapted to focus the received acoustic emissions into one or more ultrasound beams, the one or more beams directed along said one or more propagation paths.

2. The cleaning unit as claimed in claim 1, wherein the acoustic wave-directing element comprises one or more parabolic acoustic reflectors.

3. The cleaning unit as claimed in claim 1, wherein the body comprises a first outer face, and wherein the transducer arrangement is arranged for generating ultrasonic emissions which propagate out from at least a portion of the first face, and
- wherein the first face carries the arrangement of protrusions extending outwardly from the first face, the protrusions for making operative contact with a surface-to-be-cleaned during use, for enabling the mechanical cleaning action, and wherein the protrusions extend to a maximum height from the first face of less than or equal to 5 mm.

4. The cleaning unit as claimed in claim 3, wherein the protrusions are formed of a material having a Shore A Scale hardness of between 5 to 120.

5. The cleaning unit as claimed in claim 4, wherein the protrusions are formed of a material having a Shore A Scale hardness of between 10 to 100.

6. The cleaning unit as claimed in claim 5, wherein the protrusions are formed of a material having a Shore A Scale hardness of between 20 to 70.

7. The cleaning unit as claimed in claim 3, wherein the body comprises at least a first and second section, wherein the first face is comprised by the first section, and wherein the first section is detachable from the second section, and wherein the second section comprises the transducer arrangement and the electromagnetic emitter arrangement.

8. The cleaning unit as claimed in claim 1, wherein the cleaning unit is for an oral cleaning device, and wherein the body is for being received in a mouth of a user.

9. A cleaning unit for a surface cleaning device, the cleaning unit comprising:

a body;

an arrangement of protrusions or cleaning elements on a face of the body, for making operative contact with a surface-to-be-cleaned during use, for enabling a mechanical cleaning action;

an ultrasound transducer arrangement carried by the body, the transducer arrangement comprising one or more ultrasonic transducers adapted to generate ultrasonic emissions responsive to one or more drive signals;

an electromagnetic emitter arrangement carried by the body, the electromagnetic emitter arrangement adapted to generate radio frequency electromagnetic emissions responsive to supply of a radiofrequency drive signal;

wherein the ultrasound transducer arrangement and the emitter arrangement are arranged for generation of ultrasonic emissions and EM emissions which overlap spatially, to permit simultaneous ultrasound and RF stimulation of a surface-to-be-cleaned, and wherein the body comprises an ultrasound shield component arranged to inhibit propagation of ultrasound waves out from the body in one or more directions.

10. A cleaning unit for a surface cleaning device, the cleaning unit comprising:

a body;

an arrangement of protrusions or cleaning elements on a face of the body, for making operative contact with a surface-to-be-cleaned during use, for enabling a mechanical cleaning action;

an ultrasound transducer arrangement carried by the body, the transducer arrangement comprising one or more ultrasonic transducers adapted to generate ultrasonic emissions responsive to one or more drive signals;

an electromagnetic emitter arrangement carried by the body, the electromagnetic emitter arrangement adapted to generate radio frequency electromagnetic emissions responsive to supply of a radiofrequency drive signal;

wherein the ultrasound transducer arrangement and the emitter arrangement are arranged for generation of ultrasonic emissions and EM emissions which overlap spatially, to permit simultaneous ultrasound and RF stimulation of a surface-to-be-cleaned, and wherein at least a portion of the body is tubular, and wherein the body comprises an outer surface which is tubular, said outer surface forming an RF and ultrasound emission output face, and wherein the ultrasound transducer arrangement is arranged such that the ultrasound emissions are propagated away from the output face in a plurality of directions.

11. A surface cleaning device comprising:

a body;

an arrangement of protrusions or cleaning elements on a face of the body, for making operative contact with a surface-to-be-cleaned during use, for enabling a mechanical cleaning action;

an ultrasound transducer arrangement carried by the body, the transducer arrangement comprising one or more ultrasonic transducers adapted to generate ultrasonic emissions responsive to one or more drive signals;

an electromagnetic emitter arrangement carried by the body, the electromagnetic emitter arrangement adapted to generate radio frequency electromagnetic emissions responsive to supply of a radiofrequency drive signal;

an ultrasound driver circuit configured to generate one or more drive signals for the ultrasound transducer arrangement; and a radiofrequency driver circuit configured to generate an alternating radiofrequency drive signal for the electromagnetic emitter arrangement, wherein the ultrasound transducer arrangement and the emitter arrangement are arranged for generation of ultrasonic emissions and EM emissions which overlap spatially, to permit simultaneous ultrasound and RF stimulation of a surface-to-be-cleaned.

12. The surface cleaning device as claimed in claim 11, wherein the surface cleaning device comprises a base unit, and wherein the cleaning unit is releasably coupleable to the base unit of the cleaning device.

13. The surface cleaning device as claimed in claim 11, wherein the cleaning device is an oral cleaning device.

14. The surface cleaning device as claimed in claim 11, further comprising a mechanical drive assembly configured to provide a source of sonic frequency oscillatory movement, and a mechanical coupling arm for coupling the sonic frequency oscillatory movement to the cleaning unit.

* * * * *